(12) United States Patent
Lenz (10) Patent No.: US 7,785,465 B2
(45) Date of Patent: Aug. 31, 2010

(54) APPARATUS AND METHOD FOR DE-WATERING AND PURIFYING FUEL OILS AND OTHER LIQUIDS

(75) Inventor: Ronald L. Lenz, Jupiter, FL (US)

(73) Assignee: McA1 Corporation, Royal Palm Beach, FL (US), part interest ( * ) Notice: Subject to any disclaimer, the term of this patent is extended or adjusted under 35 U.S.C. 154(b) by 0 days.

(21) Appl. No.: 12/265,422

(22) Filed: Nov. 5, 2008

(65) Prior Publication Data

US 2009/0120867 A1 May 14, 2009

Related U.S. Application Data

(60) Provisional application No. 61/001,781, filed on Nov. 5, 2007.

(51) Int. Cl.
*B01D 29/00* (2006.01)
(52) U.S. Cl. ............... 210/259; 210/416.4; 210/DIG. 5
(58) Field of Classification Search ............ 210/167.01, 210/175, 181, 232, 252, 259, 416.1, 416.4, 210/519, 521, 533, 538, 540, DIG. 5
See application file for complete search history.

(56) References Cited

U.S. PATENT DOCUMENTS

| | | | | |
|---|---|---|---|---|
| 4,315,822 A * | 2/1982 | Jaisinghani | ................. | 210/794 |
| 4,406,794 A * | 9/1983 | Brigante | ...................... | 210/695 |
| 4,502,955 A * | 3/1985 | Schaupp | ...................... | 210/149 |
| 4,565,629 A * | 1/1986 | Wilson et al. | ............... | 210/248 |
| 5,078,875 A * | 1/1992 | Losing | ........................ | 210/295 |
| 5,252,229 A * | 10/1993 | Rojey et al. | ................. | 210/787 |
| 5,401,404 A * | 3/1995 | Strauss | ....................... | 210/265 |
| 5,407,571 A * | 4/1995 | Rothwell | .................... | 210/232 |
| 5,626,748 A * | 5/1997 | Rose | .......................... | 210/241 |
| 5,681,462 A * | 10/1997 | Brockhoff et al. | ........... | 210/253 |
| 6,042,722 A * | 3/2000 | Lenz | ........................... | 210/95 |
| 6,497,817 B1 * | 12/2002 | Liang | ......................... | 210/232 |
| 6,514,404 B1 * | 2/2003 | Bauer | ......................... | 210/86 |
| 2005/0011822 A1 * | 1/2005 | Reid | ......................... | 210/232 |
| 2005/0118764 A1 * | 6/2005 | Chou et al. | ................. | 438/275 |
| 2006/0207426 A1 * | 9/2006 | Platt et al. | ..................... | 95/286 |

* cited by examiner

*Primary Examiner*—Fred Prince
(74) *Attorney, Agent, or Firm*—Ronald E. Greigg (57) ABSTRACT

This invention relates to the removal by centrifugal force and by coalescence of water and other impurities from diesel fuel, jet fuel, gasoline, kerosene, bio-diesel fuel, ethanol enriched fuel, heating oil, hydraulic oil, cutting oils, and other liquids with a specific gravity of less than one. The invention provides a contaminate removing apparatus, in particular for de-watering and purifying fuel liquids, comprising modular components consisting of but not limited to a water-separator module, a filter module, a pump module, and a control module to be used in plurality or as standalone components to de-water and purify fuel oils and other liquids.

18 Claims, 11 Drawing Sheets

APPARATUS AND METHOD FOR DE-WATERING AND PURIFYING FUEL OILS AND OTHER LIQUIDS

REFERENCE TO RELATED APPLICATIONS

This application is based on Provisional Patent Application 61/001,781 filed on Nov. 5, 2007.

BACKGROUND OF THE INVENTION

1. Field of the Invention

This invention relates to the removal by centrifugal force and by coalescence of water and other impurities from diesel fuel, jet fuel, gasoline, kerosene, bio-diesel fuel, ethanol enriched fuel, heating oil, hydraulic oil, cutting oils, and other liquids with a specific gravity of less than one (1).

2. Description of the Prior Art

U.S. Pat. No. 6,042,722 issued to Ronald L. Lenz Mar. 28, 2000 An apparatus for separating water and contaminants from a fuel which has a specific gravity which is lower than that of water. Contaminated fuel is drawn from a bottom of a tank and passed into a separator. The water stays at the bottom of the separator and is drained off. The fuel is forced upwardly from which any droplets of water flow along collector plates and fall to the bottom of the separator. The fuel is passed through a filter which removes any particles of matter then the fuel is directed back to the tanks. The process can be repeated for as many times as necessary to cleanse the fuel of water and contaminates.

OBJECTS AND SUMMARY OF THE INVENTION

The object of this invention is to improve the apparatus and method for de-watering and purifying fuel oils and other liquids as described in U.S. Pat. No. 6,042,722.

It is therefore an advantage of this invention to provide modified modular components consisting of but not limited to a water-separator module, a filter module, a pump module, and a control module to be used in plurality or as stand alone components to de-water and purify fuel oils and other liquids.

Another advantage of this invention is to de-water and purify fuel oils and other liquids, utilizing one or more of the modular components of this invention in the fuel system which operates an engine.

Another advantage of this invention is to de-water and purify oils and other liquids, utilizing one or more of the modular components of this invention in a hydraulic system.

Yet another advantage of this invention is to de-water and purify oils and other liquids, utilizing one or more of the modular components of this invention in an engine lubricating system.

Yet another advantage of this invention is to de-water and purify oils and other liquids, utilizing one or more of the modular components of this invention in a machinery lubricating system.

Still another advantage of this invention is to de-water and purify oils and other liquids, utilizing one or more of the modular components of this invention in a mobile storage tank cleaning system.

While another object of this invention is to de-water and purify oils and other liquids, utilizing one or more of the modular components of this invention made from alloys of metals, plastics, or composites.

Yet another object of this invention is to de-water and purify oils and other liquids, utilizing one or more of the modular components of this invention in concert with a water detecting device or timer to automatically turn the system on and off.

Yet another advantage of this invention is to de-water and purify oils and other liquids, utilizing one or more of the modular components of this invention in various sizes for engine fuel systems as small as one (1) Horsepower to engine fuel systems as large as three thousand (3,000) horsepower.

Yet another advantage of this invention is to de-water and purify oils and other liquids, utilizing one or more of the modular components of this invention in various sizes for liquid storage tanks as small as one (1) gallon to liquid storage tanks as large as one million (1,000,000) gallons.

Starting out from the known prior art, it is the task to be solved by the present invention to drastically simplify the design and construction of the apparatus and add more uses to the apparatus while maintaining all of the advantages such that the production costs of the apparatus as well can be drastically decreased.

Other and further objects and advantages of the invention will become obvious to those skilled in the art upon a review of the following description of the drawings.

DETAILED DESCRIPTION OF THE PREFERRED EMBODIMENT

Figure 1:
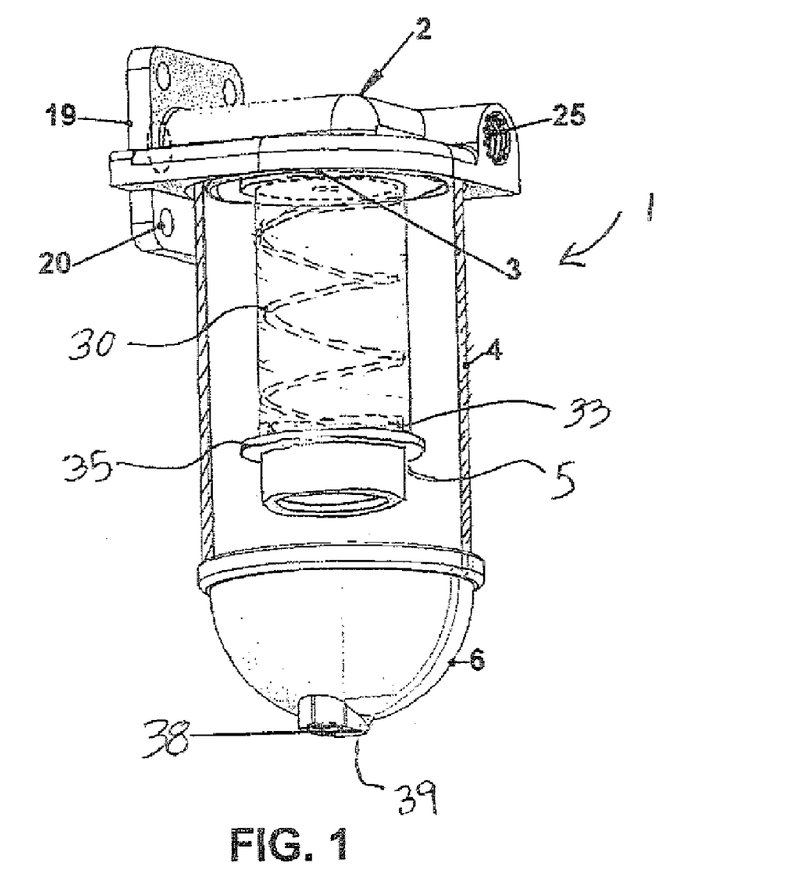
FIG. 1 illustrates a perspective front view of the water/separator module used in a contaminate removing system using a separator tube of a first variant.
Figure 3:
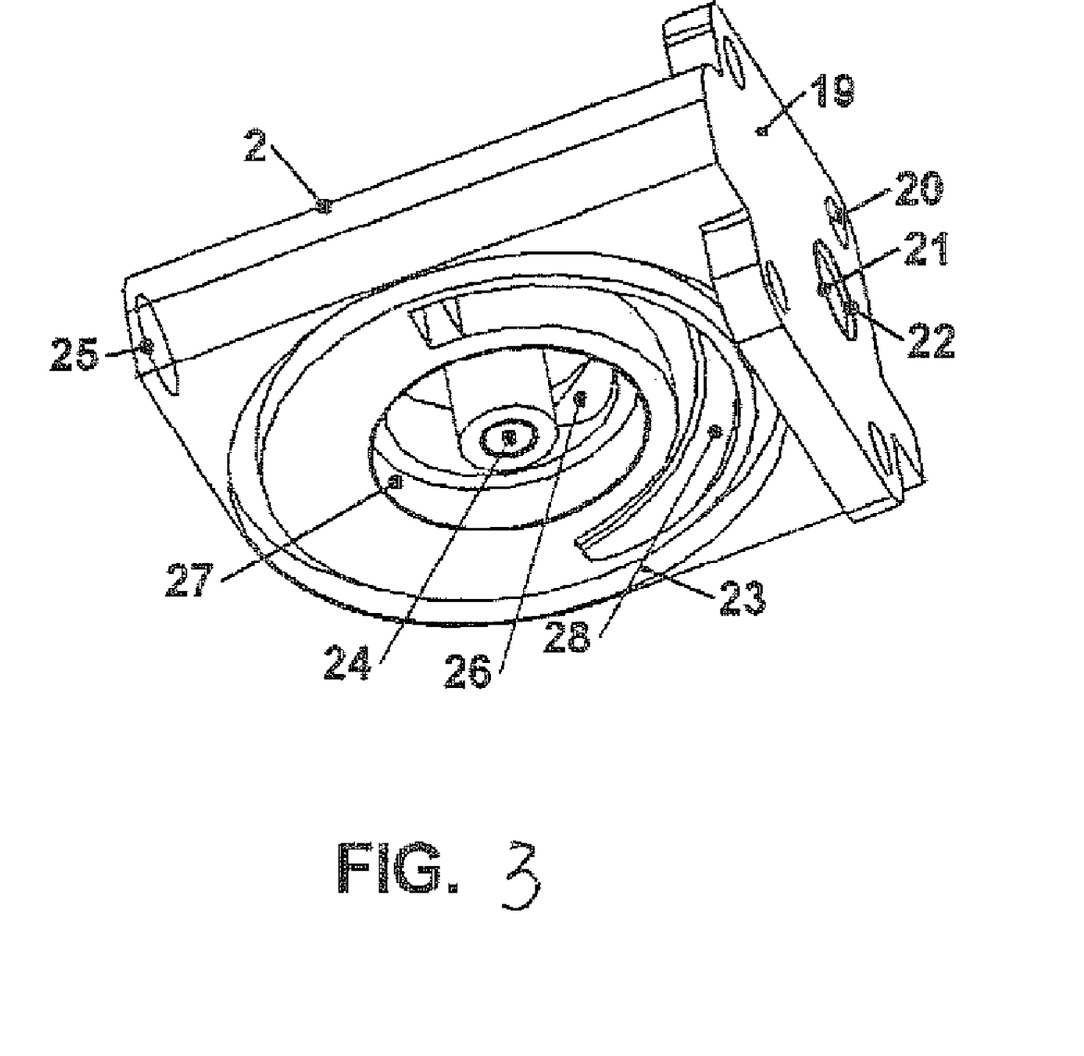
FIG. 3 is a perspective bottom view of the upper end cap of the water/separator module used in a contaminate removing system.

Now referring to the drawings there is shown a water/separator module 1 in accordance with the invention. FIG. 1 illustrates a perspective front view of a water/separator module including an upper end cap 2 and a bottom end cap 6. An outer tubular body 4 is held between the upper end cap 2 and the bottom end cap 6 by use of a tie rod 71, shown in FIG. 4, which is secured by a tightening nut 70. The outer tubular body can be made of clear plastic or metal. The tubular body 4 is provided with seals on the upper and lower ends thereof to prevent any leakage between the ends of the tubular body and the upper and bottom end caps 2, 6, respectively. Referring also to FIG. 3, it can be seen that an axially aligned separator tube 3 extends downward from the upper end cap 2 and is confined by a threaded circular portion 27 of the upper end cap which surrounds an inlet opening 26 in the upper end cap 2 and connects to an outlet port 21. The upper end cap has a connecting flange 19 which surrounds the outlet port 21. The outlet port 20 is provided with a circular o-ring seal face 22 to prevent leakage when attached to another flange, to be described hereinafter. The flange 19 has a plurality of mounting holes to facilitate attachment to similar flanges on other modular components of this invention, to be described hereinafter. The upper end cap 2 is made from a metal, plastic, or composite casting or die casting as with the inlet port that connects to a helix shape groove that directs fluid in a circular and downward direction.

The lower end of the separator tube 3 surrounds a threaded inner flange 33 (shown in hidden lines) of a vortex finder 5 which is also provided with an outer flange 35. A helix coalescer plate inside the axially aligned tube extends downward from the upper end cap to the inside flange on the vortex finder. The vortex finder is provided with the outer flange to create vortices in the downward flowing fluid. An air inlet valve 29 is provided at the top of the upper end cap 2 and a drain port 38 and drain valve 76 is provided in the lower end cap 6. The upper and lower end caps can be equipped with an optional water sensor probe, electric heating element, or fluid heat exchanger. The contaminant holding capacity of any size water/separator module can be increased by simply increasing the length of the outer tubular body.

The bottom end cap 6 is provided with the threaded drain port 38 to which the drain valve 76 is attached. The bottom end cap 6 is held in place with the tie rod 71 which extends through hole 39 in the bottom end cap 6 to a threaded hole 24 provided in the upper end cap. A tightening nut 70, secured the bottom end cap to the tubular body 4, and a washer and a seal are provided therebetween to prevent any leakage around the tie rod.

Figure 2:
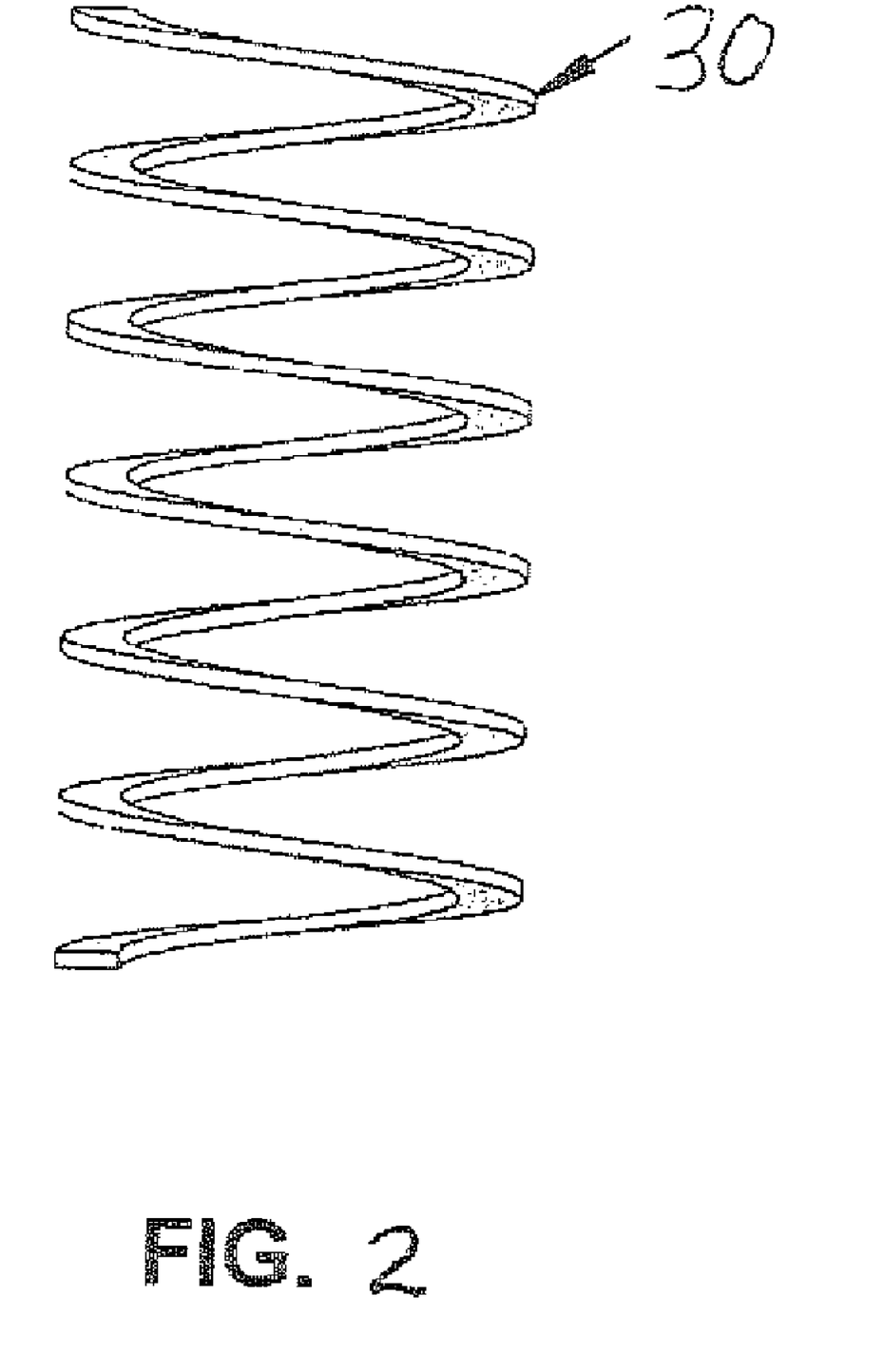
FIG. 2 illustrates a perspective front view of the helix coalescer of the separator tube of FIG. 1.

FIG. 2 illustrates a perspective front view of the a helix coalescer 30 which is disposed in the separator tube 3 according to a first variant shown in FIG. 1, to create vortices containing contaminants that will collide and grow in size. The larger droplets will overcome the upward flow of the fluid (Stokes Law) in the separator tube 3 and fall to the bottom of the bottom end cap 6.

In operation of the water/separator module FIG. 1, the contaminated fluid is moved into the inlet port 25 of the upper end cap 2 and to a helix groove 28 disposed in the upper end cap 2. In the helix groove 28, the heaver fluid and contaminates are rotated to the outside of the outer tubular body 4 by centrifugal force and are rotated in a downward circular motion until approximately 90% of the contaminate have coalesced and settled to the bottom of the end cap 6. The fluid containing the smallest contaminate droplets is carried upward in a circular motion through the vortex finder 5 into the separator tube 3, where vortices form as they pass over the helix coalescer 30. The vortices cause the contaminant droplets to collide, coalesce, and fall to the bottom of end cap 6. To drain the water/separator module of water and contaminates, the air inlet valve 75 is opened and the drain valve 76 is opened.

Figure 4:
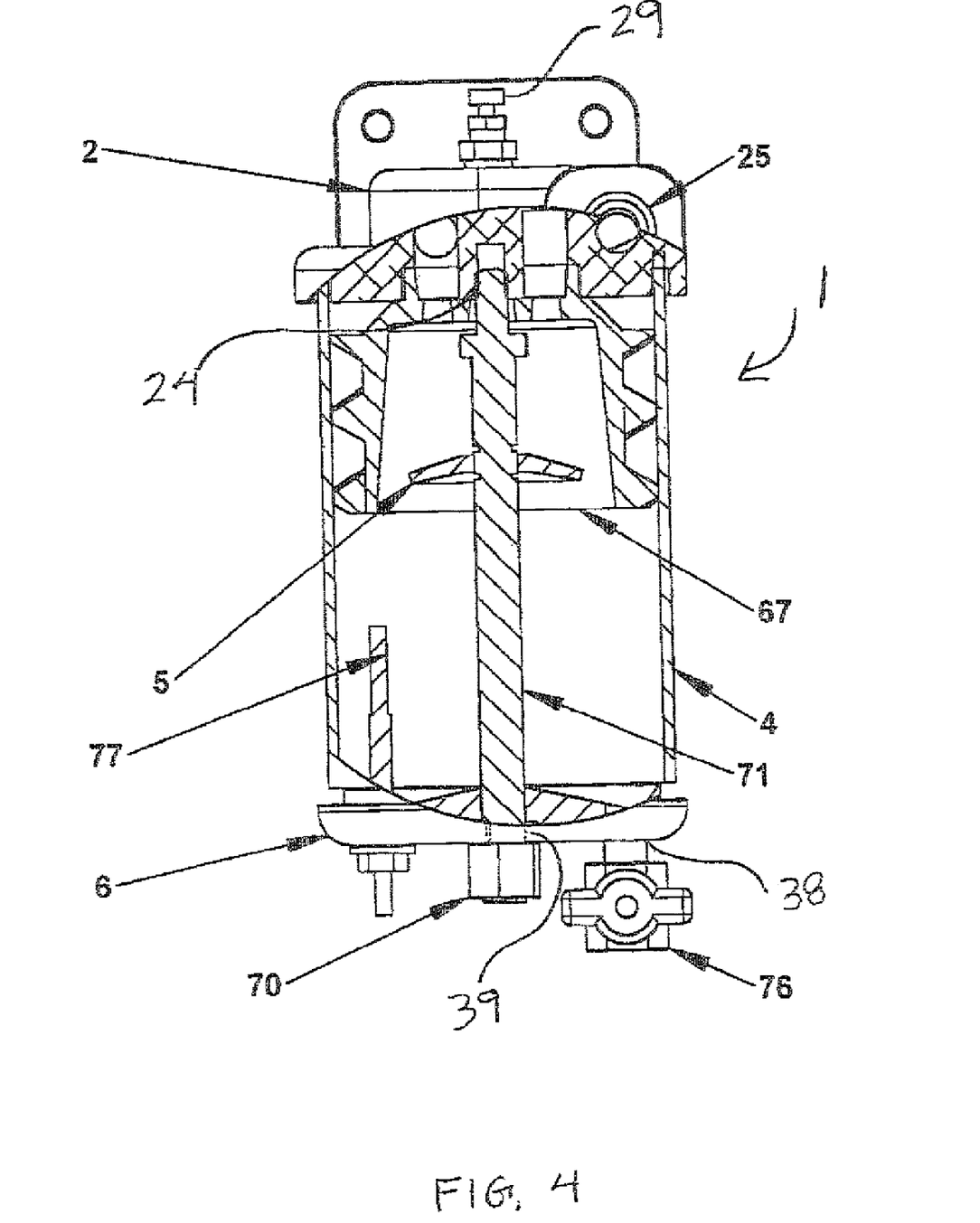
FIG. 4 illustrates a partial sectional front view of the water/separator module used in a contaminate removing system using a separator tube of a second variant.
Figure 5:
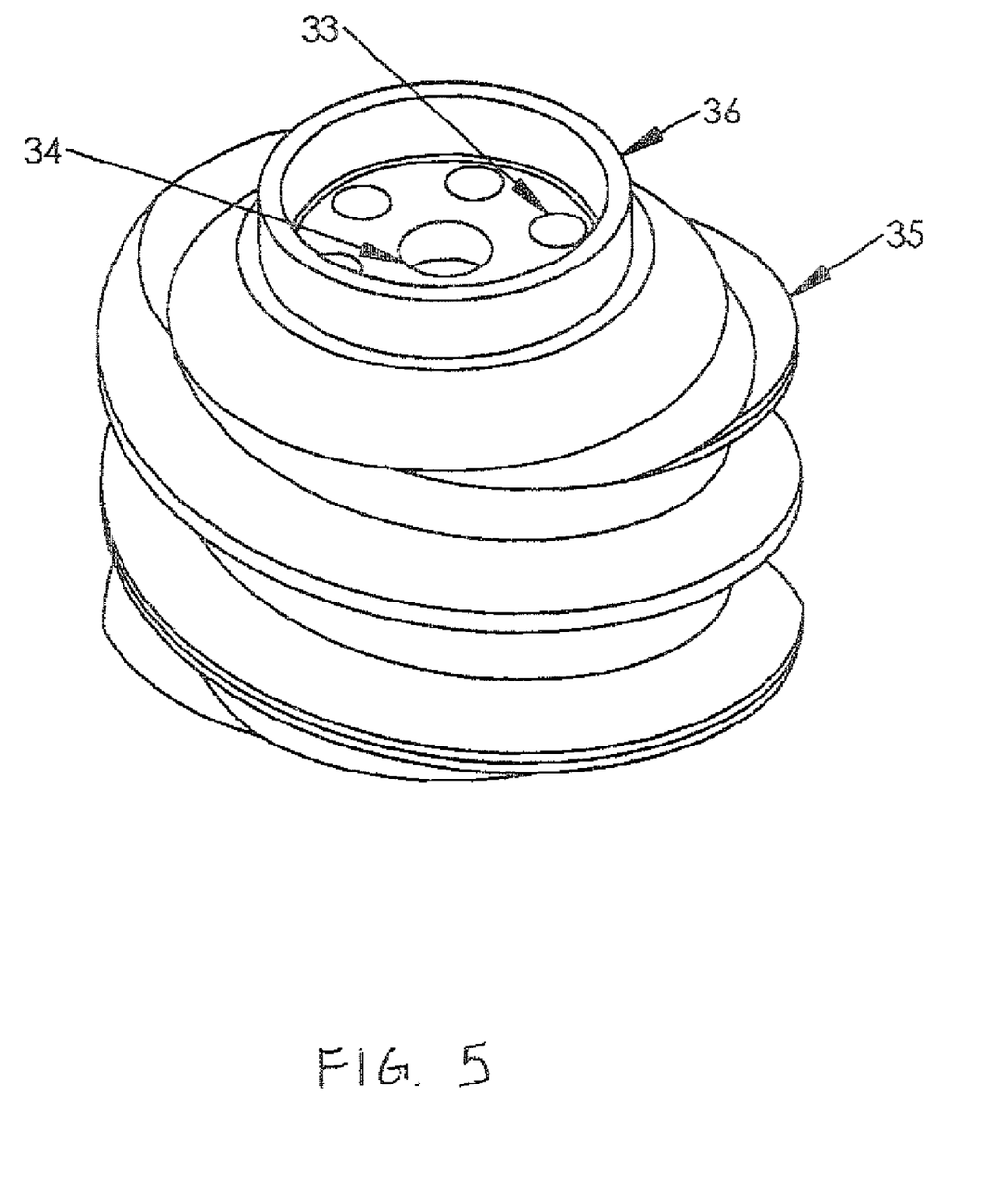
FIG. 5 illustrates a perspective side view of the separator tube of the water/separator module of FIG. 4.

FIGS. 4 and 5 illustrates the water/separator module 1 used in a contaminate removing system and a separator tube 67 of a second variant. The separator tube 67 is attached to the upper end cap 2 as described with reference to FIG. 1. The helix coalescer 35, here embodied with dual helix flutes, is disposed on the outside of the separator tube 67. A conical circular plate 5 is mounted to the tie rod 71. A sensor probe 77 is mounted to the end cap 6 and extends into the tubular body 4 for taking measurements as desired.

The upper end caps inlet port connects to the helix shape groove 28 that directs fluid in a circular and downward direction. As the droplets of water are forced to the outside of the helix groove 28 they begin to coalesce. The axially aligned tube 67 with dual helix flutes of the coalescer 35 that extend outward from the tube and that extend downward from the upper end cap 2 cause the water droplets to continue to coalesce as they flow downward. The enlarged droplets of water and other matter that has a specific gravity greater than the fluid spirals to the bottom of the separator. The smallest water droplets flow upward through the inside of the axially aligned tube. As the smallest droplets pass the circular plate baffle 5 located inside the axially aligned tube 67 vortices are formed causing the droplets to coalesce and grow in size. When the droplet size is large enough to overcome the upward flow of the fluid, (Stokes Law), they will drop to the bottom of the separator.

The upper and lower end caps can be equipped with an optional water sensor probe, electric heating element, or fluid heat exchanger. The contaminant holding capacity of any size water/separator module can be increased by simply increasing the length of the outer tubular body.

Figure 6:
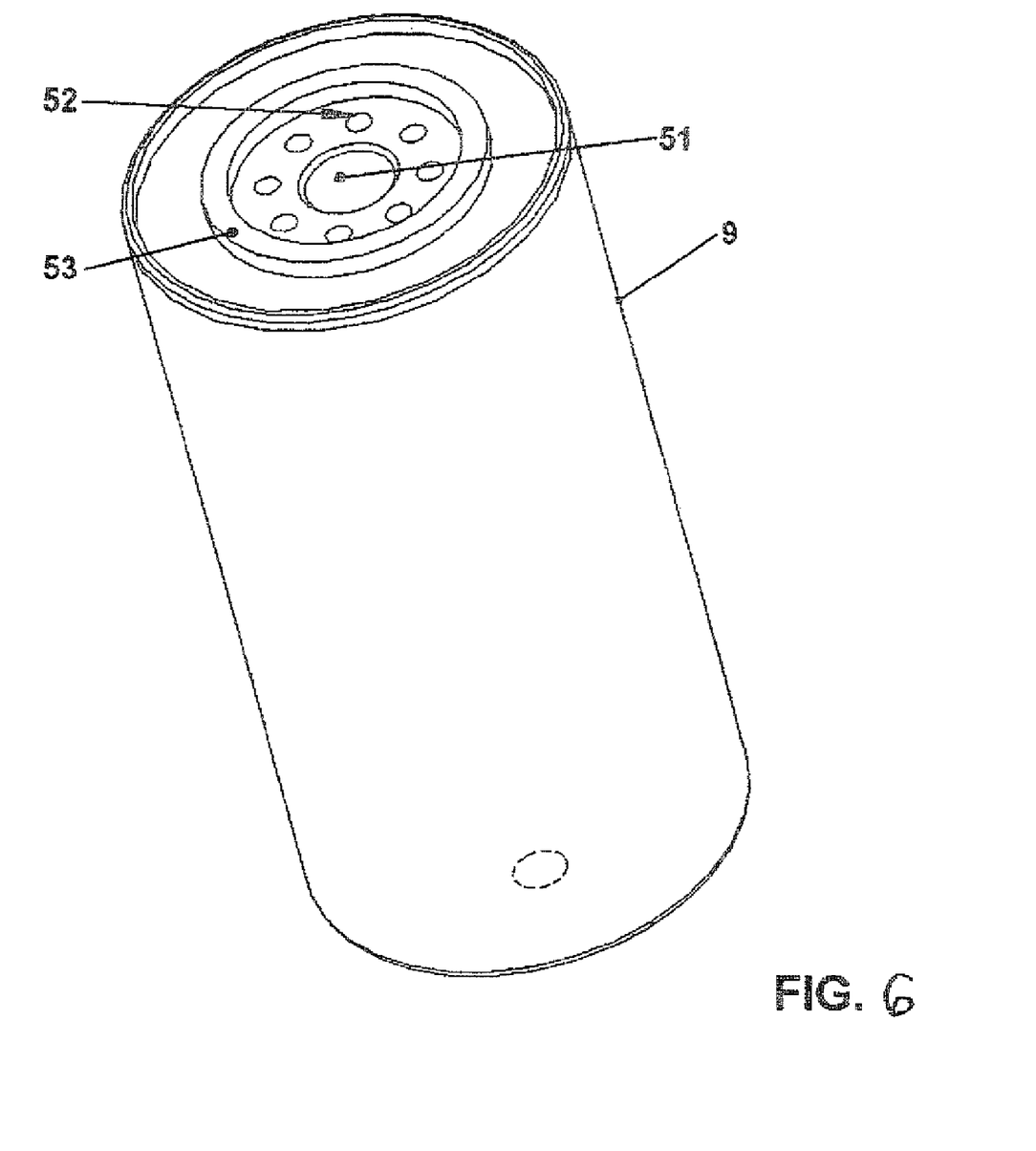
FIG. 6 illustrates a perspective front view of the a filter cartridge of the filter module used in a contaminate removing system.
Figure 7:
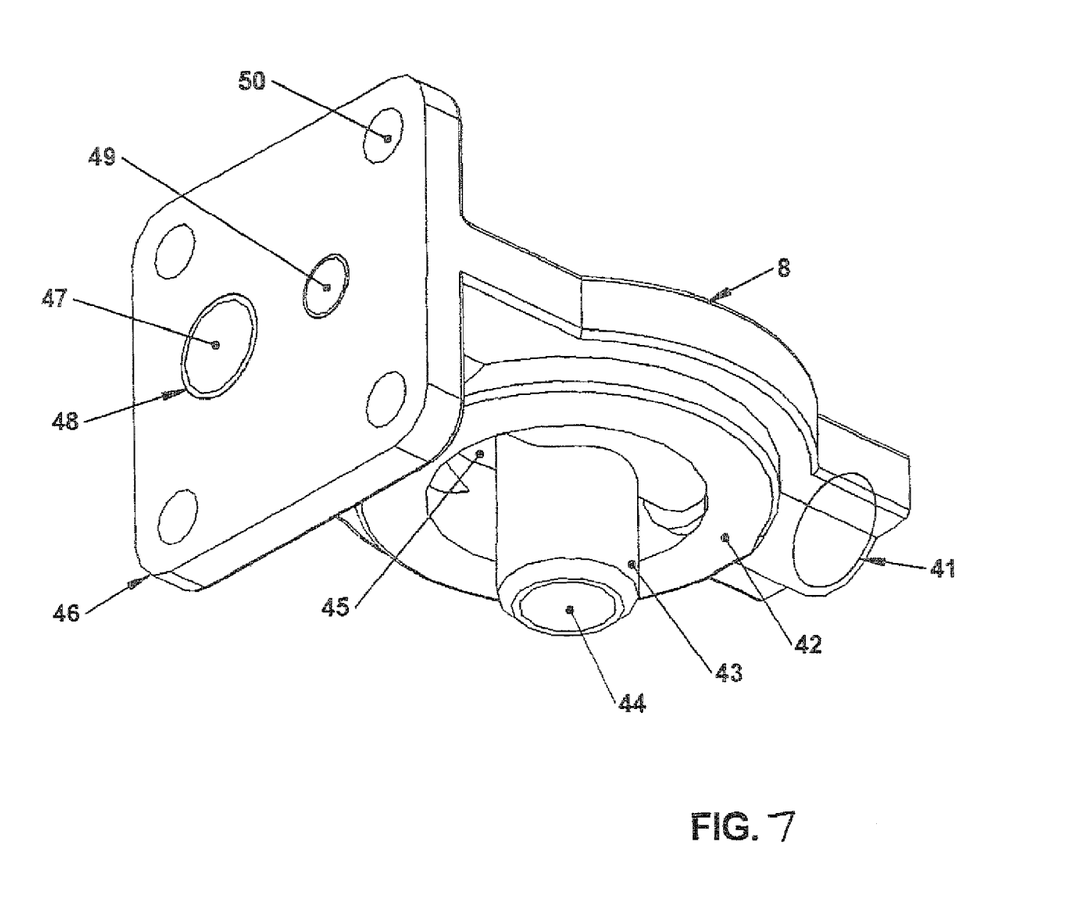
FIG. 7 is a perspective bottom view of the upper end cap of the filter module used in a contaminate removing system.

FIGS. 6 and 7 show the elements of the filter module including filter cartridge 9, an upper end cap 8, and outlet port 41. Inlet port 47 is connected to an outlet opening 45 that will let contaminated fluid pass to the inlets 52 of spin on filter cartridge 9. Spin on filter 9 is attached to the upper end cap 8 with an axial nipple 43 which connects to the outlet port 41 on the upper cap 8 and the filters outlet port 51. The filter is provided with a seal 53 that is in contact with a surface 42 on upper end cap 8 to prevent leakage of fluid. The upper end cap 8 has a connecting flange 46 which surrounds the inlet port 47 which is provided with a circular o-ring seal face 48 to prevent leakage when attached to another flange. The flange 46 has a plurality of mounting holes 50 to facilitate attachment to similar flanges on other modular components of this invention.

In operation of the present filter module, contaminated fluid enters port 47, and flows to outlet chamber 45 and into the top of filter 9 through a plurality of equally spaced inlet apertures 52, where filter media removes particulate matter and other contaminates. The fluid then flows up through outlet port 51 into inlet port 44 which is connected to outlet port 41. Outlet port 49 is plugged. However if the filter module is used in concert with a pump module then outlet port 41 is plugged and the fluid flows through outlet port 49. The filter module can be used with a wide variety of spin on filters with different capacities, flow rates, filter media and configurations.

The preferred filter module of the above defined kind is made from a metal, plastic, or composite casting or die casting as an upper end cap with an inlet port that connects to a channel through which the fluid enters and is directed downward through an outlet port and into the upper area of a spin-on filter. The spin-on filter is secured to the upper end cap by the threaded axial nipple that connects with the two outlet ports.

One of the outlet ports will be plugged to direct the flow of the fluid to the other outlet port. The upper end cap has a connecting flange which surrounds one of the outlet ports and is provided with an o-ring groove and a plurality of equally spaced bolt holes to connect the filter module to a mounting bracket and/or other modules of the apparatus. The filter modules can be used with commercially manufactured spin-on filters of various sizes and media down to one (1) micron.

Figure 8:
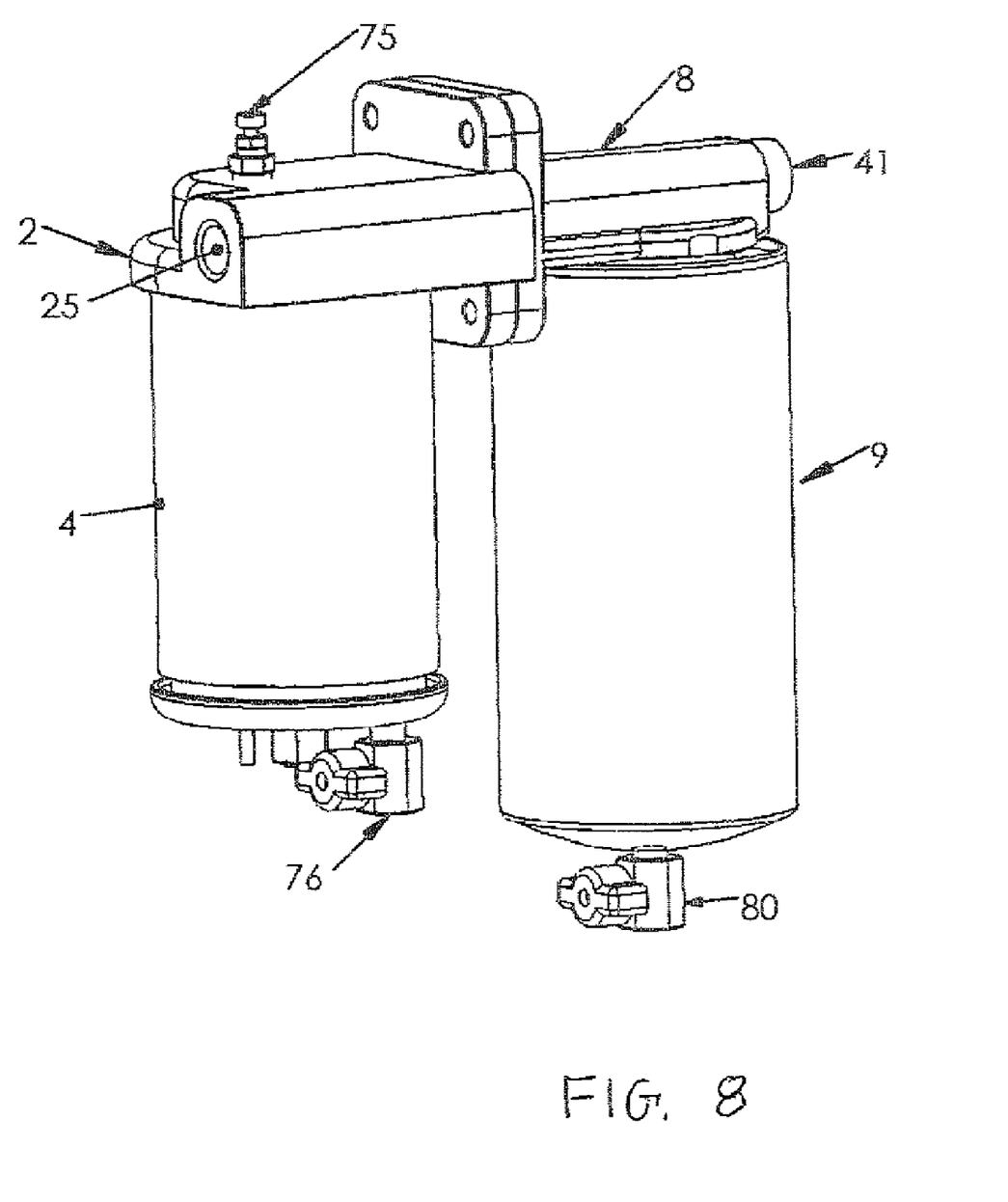
FIG. 8 illustrates a perspective side view of the filter module assembled in concert with the separator module used in a contaminate removing system.

FIG. 8 illustrates a perspective side view of the present filter module assembled in concert with the present separator module used in a contaminate removing system. In operation the contaminated fluid enters inlet port 25 of the water/separator module where water and other contaminates are removed. The fluid passes through outlet port 21, FIG. 3 and into inlet port 47, FIG. 7 of the filter module where filter media removes particulate matter and other contaminates. The purified fluid then flows out of outlet port 41. This combination of separation and filtration modules can be used on engine fuel systems as well as other uses.

Figure 9:
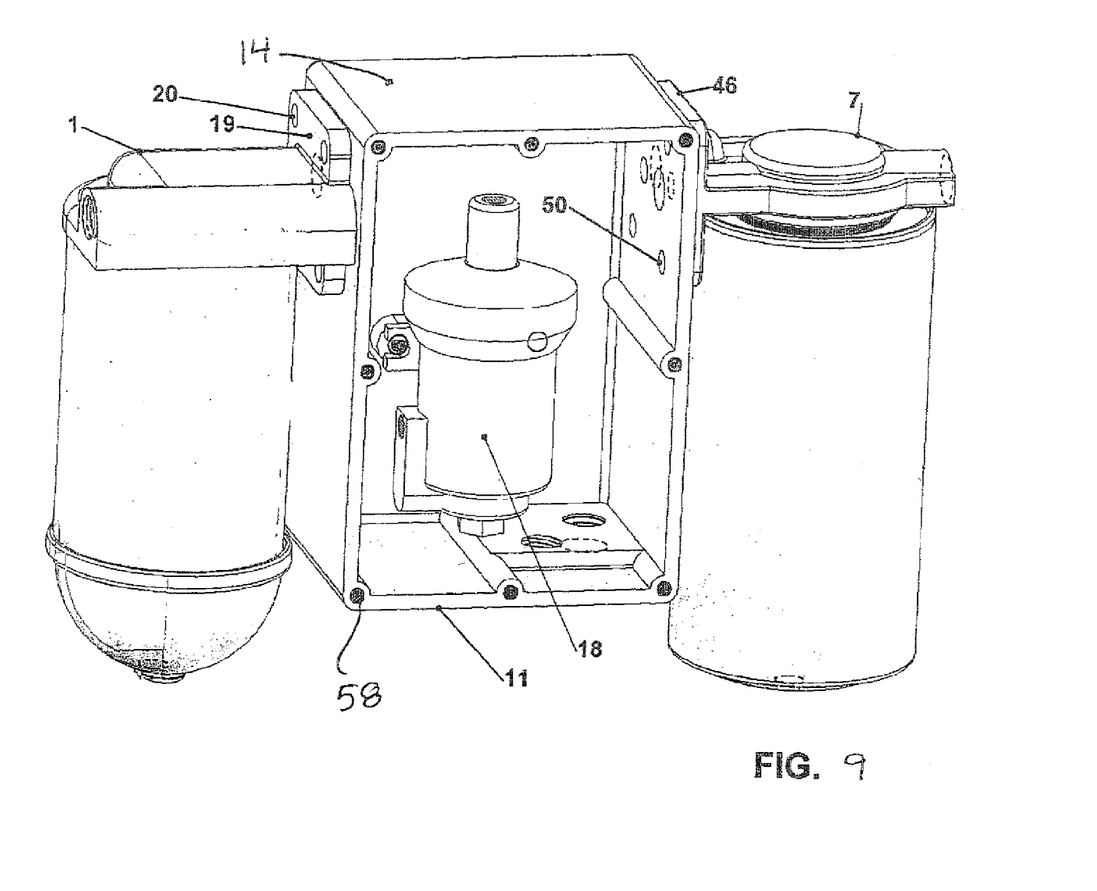
FIG. 9 illustrates a perspective front view of the water/separator module assembled in concert with the pump module and the filter module used in a contaminate removing system.

Seen in FIG. 9 is a perspective front view of a pump housing 11. The pump housing 11 provides a plurality of mounting holes for the attachment of the water/separator, filter, and control modular components of this invention. Fluid lines are routed through ports to connect the pump 18 to the inlets and outlets of connected components. A port is also provided for routing an electrical feed cable. The pump 18 is disposed in the pump housing can be attached thereto by threaded holes. A plurality of threaded holes 58 are provided to attach a cover of the pump housing 11. A pump housing cover contains a plurality of holes to attach the cover to the pump housing and mount switches, a timer, and any other controls necessary for operating a pump, etc.

The preferred pump module of the above defined kind is made from a metal, plastic, or composite casting or die casting as a pump mounting box with ports and a plurality of equally spaced bolt holes to connect a filter module, water/separator, and/or mounting bracket with matching equally spaced holes. The pump module cover may contain a control module that will start and stop the pump, detect the presents of water in a system, time a pumping duration and start/stop time, sound an alarm, activate a contaminate removal system, or shut down an engine.

FIG. 9 illustrates a perspective front view of the water/separator module 1 assembled in concert with the pump module 14 and the filter module 7 used in a contaminate removing system where the operation is similar to U.S. Pat. No. 6,042,722. Contaminated fluid is drawn from a bottom of a tank and passed into the separator module 1. The water and contaminate stays at the bottom of the separator and is drained off. The fluid is passed through a filter module 7 by means of the pump module 14. The pump module 14 draws contaminated fluid into the filter module 1. The filter module 7 removes any particles of matter and then the fluid is directed back to the tanks or on to an engine. The process can be repeated for as many times as necessary to cleanse the fluid of water and contaminates.

FIGS. 10 through 17 depict in simplified diagrams the various embodiments of the contaminate removing system, according to the invention.

Figure 10:
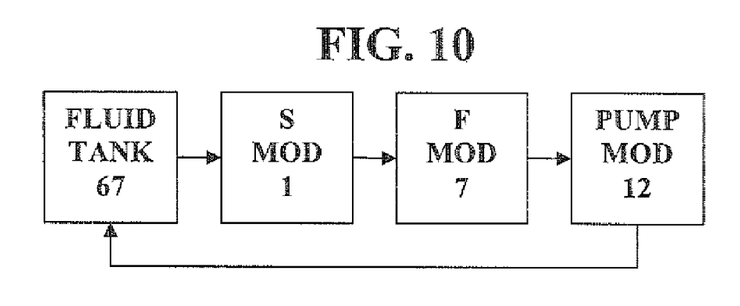
FIG. 10 illustrates a flow diagram of the contaminate removing system that re-circulates fluids.

FIG. 10 is a flow chart depicting the fluid flow from a fluid tank 67 to the separator module 1 through the present filter module 7 to the present pump module 12. Then the fluid is recycled back to a fluid tank 67.

Figure 11:
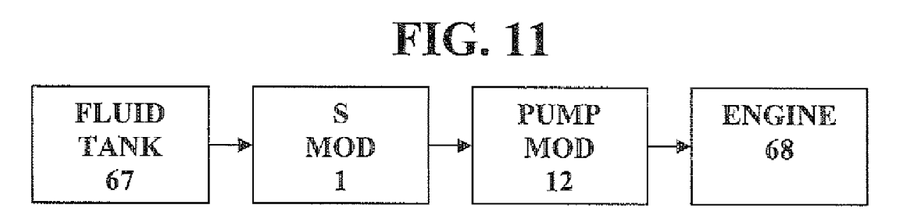
FIGS. 11-17 illustrate flow diagrams of the present contaminate removing system that supply an engine.

FIG. 11 is a flow chart depicting the fluid flow from a fluid tank 67 to the separator module 1 to the present pump module 12 and then on to an engine.

Figure 12:
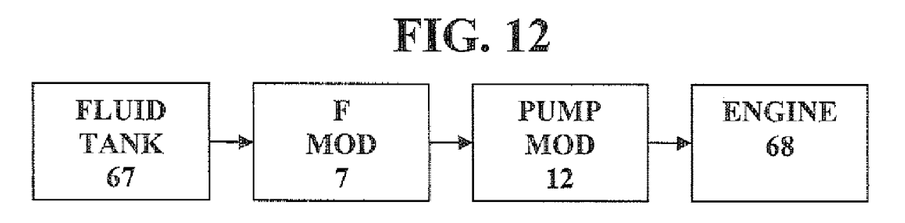

FIG. 12 is a flow chart depicting the fluid flow from a fluid tank 67 through the filter module 7 to the present pump module 12 and then on to an engine 68.

Figure 13:
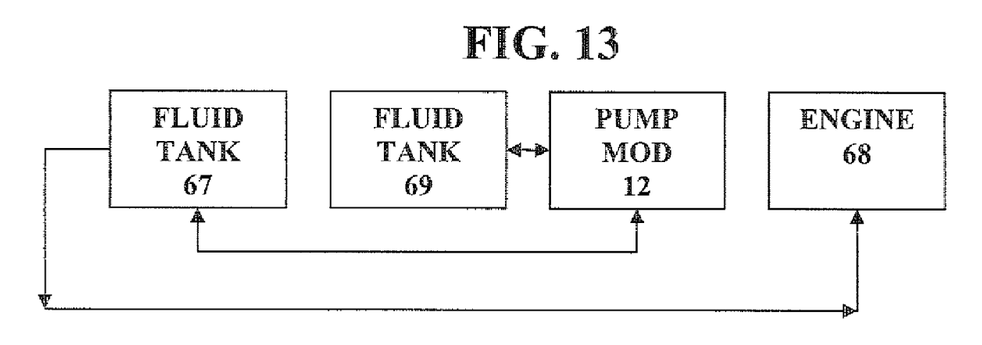

FIG. 13 is a flow chart depicting the fluid flow from a fluid tank 67 to an engine with the pump module transferring fluid from fluid tank 69 to the fluid tank 67.

Figure 14:
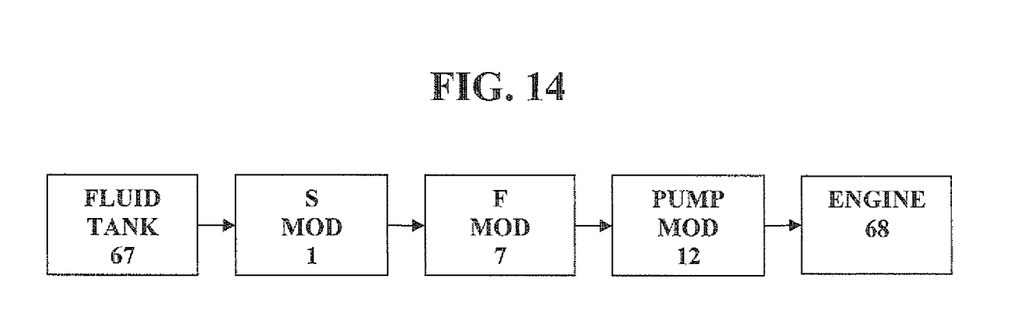

FIG. 14 is a flow chart depicting the fluid flow from a fluid tank 67 to the separator module 1 through the present filter module 7 to the present pump module 12 and then on to the engine 68.

Figure 15:
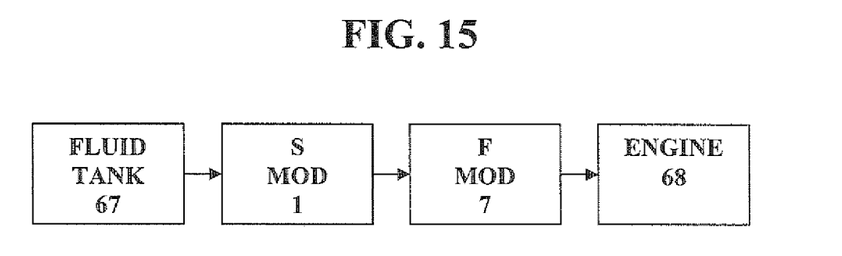

FIG. 15 is a flow chart depicting the fluid flow from a fluid tank 67 to the separator module 1 through the present filter module 7 then on to the engine 68.

Figure 16:
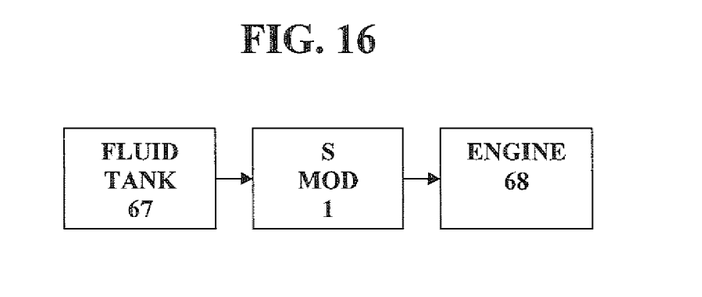

FIG. 16 is a flow chart depicting the fluid flow from a fluid tank 67 to the separator module 1 then on to the engine 68.

Figure 17:
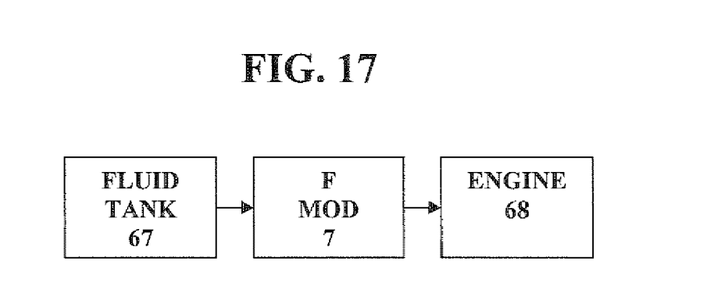

FIG. 17 is a flow chart depicting the fluid flow from a fluid tank 67 to the filter module 7 then on to the engine 68.

I claim:

1. An apparatus for purifying liquids, said apparatus comprising:
   modular components including a water-separator module, a filter module, a pump module, and a control module, said modules capable of being used in plurality or as stand alone components to de-water and purify fuel oils and other liquids,
   said water-separator module having an upper end cap, an outer tubular body, and an inner separator tube extending downwardly from said upper end cap,
   said inner separator tube being located inside said outer tubular body, and said inner separator tube having a helix coalescer located inside thereof.

2. The apparatus of claim 1 wherein said inner separator tube is confined by a threaded circular portion located on said upper end cap.

3. The apparatus of claim 2 wherein said inner separator tube has a lower end which surrounds a threaded inner flange of a vortex finder.

4. The apparatus of claim 3 wherein the vortex finder further includes an outer flange to create vortices in downwardly flowing fluid.

5. The apparatus of claim 1 wherein said upper end cap has an outlet port surrounded by a connecting flange, said connecting flange having a plurality of mounting holes to facilitate attachment to similar flanges on other modular components.

6. The apparatus of claim 1 wherein the filter module includes an upper end cap having an outlet port and an inlet port.

7. The apparatus of claim 6 wherein the filter module further includes a filter cartridge attached to the upper end cap.

8. The apparatus of claim 7 wherein the filter cartridge has inlets and the upper end cap further includes an outlet opening which allows contaminated fluid to pass to the inlets.

9. The apparatus of claim 6 wherein said outlet port is surrounded by a connecting flange, said connecting flange having a plurality of mounting holes to facilitate attachment to similar flanges on other modular components.

10. The apparatus of claim 1 wherein said upper end cap has a helix shape groove that directs fluid in a circular and downward direction.

11. An apparatus for purifying liquids, said apparatus comprising:
    modular components including a water-separator module, a filter module, a pump module, and a control module, said modules capable of being used in plurality or as stand alone components to de-water and purify fuel oils and other liquids,
    said water-separator module having an upper end cap, said upper end cap having a separator tube attached thereto,
    said separator tube having dual helix flutes disposed on the outside thereof, said dual helix flutes forming a coalescer that extends outward from the separator tube.

12. The apparatus of claim 11 further including a conical plate mounted to a tie rod and located within the separator tube.

13. The apparatus of claim 11 wherein said upper end cap has an outlet port surrounded by a connecting flange, said connecting flange having a plurality of mounting holes to facilitate attachment to similar flanges on other modular components.

14. The apparatus of claim 11 wherein the filter module includes an upper end cap having an outlet port and an inlet port.

15. The apparatus of claim 14 wherein the filter module further includes a filter cartridge attached to the upper end cap.

16. The apparatus of claim 15 wherein the filter cartridge has inlets and the upper end cap further includes an outlet opening which will allow contaminated fluid to pass to the inlets.

17. The apparatus of claim 14 wherein said outlet port is surrounded by a connecting flange, said connecting flange having a plurality of mounting holes to facilitate attachment to similar flanges on other modular components.

18. The apparatus of claim 11 wherein said upper end cap has a helix shape groove that directs fluid in a circular and downward direction.

* * * * *